United States Patent
McFarlane et al.

[11] Patent Number: 6,138,802
[45] Date of Patent: Oct. 31, 2000

[54] MODULAR PEDAL ASSEMBLY

[75] Inventors: Jeffrey Alan McFarlane; Michael James O'Neill, both of Harper Woods, Mich.

[73] Assignee: Teleflex Incorporated, Plymouth Meeting, Pa.

[21] Appl. No.: 09/197,141

[22] Filed: Nov. 20, 1998

[51] Int. Cl.[7] .................................................. F16D 67/02
[52] U.S. Cl. ........................... 192/13 R; 29/469; 74/560; 384/428
[58] Field of Search ........................... 192/13 R; 74/560; 180/315; 403/152; 248/544; 384/428, 295; 29/469

[56] References Cited

U.S. PATENT DOCUMENTS

| | | | |
|---|---|---|---|
| 3,199,366 | 8/1965 | Herrington, Jr. . | |
| 3,242,763 | 3/1966 | Buchwald | 74/560 |
| 3,575,063 | 4/1971 | Harrom | 192/13 R X |
| 3,966,275 | 6/1976 | Cain et al. . | |
| 3,995,510 | 12/1976 | Yost | 74/478.5 |
| 4,060,144 | 11/1977 | Teti | 74/560 X |
| 4,194,720 | 3/1980 | Callaghan et al. | 251/77 |
| 4,299,137 | 11/1981 | Malecha | 180/315 X |
| 4,637,741 | 1/1987 | Gillet | 384/428 |
| 5,328,274 | 7/1994 | Wallace et al. | 384/428 |
| 5,398,569 | 3/1995 | Carr | 74/560 |
| 5,690,000 | 11/1997 | Terrel | 74/560 |
| 5,927,153 | 7/1999 | Bhangoo et al. | 74/560 X |

FOREIGN PATENT DOCUMENTS 229812  1/1990  Japan .

*Primary Examiner*—Rodney H. Bonck
*Attorney, Agent, or Firm*—Howard & Howard

[57] ABSTRACT

A modular pedal assembly (10) includes a support base (12) for attachment to a vehicle structure (14), a clutch pedal arm (16), and a brake pedal arm (18). A first bearing block (20) rotatably supports the clutch pedal arm (16) for rotation about an axis and a second bearing block (22) rotatably supports the brake pedal arm (18) for rotation about the same axis. A support interconnects the clutch (16) and brake (18) pedal arms for rotation about the axis. The pedal assembly (10) further includes a connector (24) for connecting the first bearing block (20) to the second bearing block (22) to define a pedal subassembly for attachment to the base (12). The connector (24) locates and maintains the first bearing block (20) at a pre-determined distance from the second bearing block (22) to ensure proper orientation for installation. The pedal subassembly is then fastened to the base (12) to form the pedal assembly (10). After installation the connector (24) takes up side to side play between the first (20) and second (22) bearing blocks and acts as a stiffener to provide additional structural support.

35 Claims, 3 Drawing Sheets

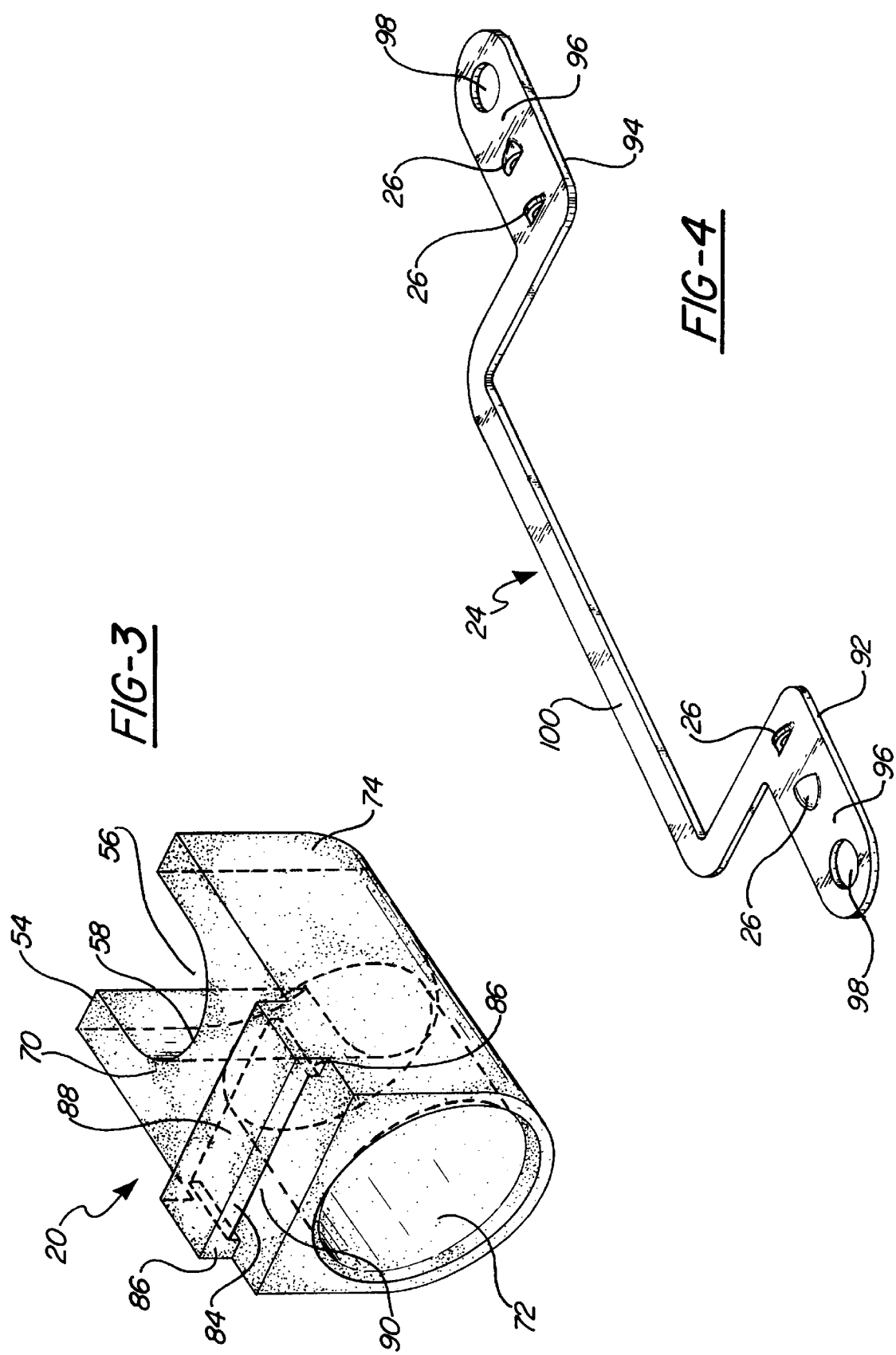

MODULAR PEDAL ASSEMBLY

TECHNICAL FIELD

The subject invention relates to a modular pedal assembly as installed in a vehicle. Specifically, the modular pedal assembly includes at least two pedal arms, each supported on a bearing block, with a connector interconnecting the bearing blocks to form a pedal subassembly for installation into a base component.

BACKGROUND OF THE INVENTION

Pedal assemblies are used in vehicles to control the movement of the vehicle. For example, a vehicle driver applies a force to a brake pedal to actuate a vehicle braking system for slowing or stopping the vehicle. Vehicles also include an accelerator pedal which is actuated by the driver for controlling engine throttle position, and which ultimately controls how fast or slow the vehicle moves. Also, vehicles having a manual transmission will include a clutch pedal which is actuated by the driver when a gear change is desired.

Installation of these pedal assemblies into a vehicle is often complicated and time consuming. An example of such an assembly is shown in U.S. Pat. No. 4,637,741. The pedal assemblies are typically installed into a base component that is attached to a vehicle structure such as the firewall or vehicle frame. The base component is usually a bracket member or a casting. The pedal assemblies usually includes at least two pedal arms which are supported on a pivot shaft or rod which is installed into the casting. It is difficult to provide a good bearing surface between a surface on the casting and a surface on the pivot shaft.

Often the casting or bracket requires complex machining for these pivot areas. The pivot bearing surface areas in the casting or bracket must therefore be machined to tight tolerances for engagement with a mating bearing surface on the pedal shaft. Machining a casting or a bracket in such a manner is very complicated and expensive. Also, installing the pivot shaft into the casting so that the bearing surface on the shaft is properly aligned with the machined bearing surface in the casting is difficult. pedal assemblies can also be separately installed into the vehicle's base component which is time consuming and requires a significant amount of valuable packaging space. Each of the pedals in this type of configuration often have to be installed into the casting by sliding the pivot that supports the pedal through holes in the casting or bracket. The pivot shaft must then be properly positioned in the bracket so that a good bearing surface is provided between the bracket and the pivot shaft. Alternatively, the pivot shaft may be slid through a tube that has been attached to the bracket. Either method makes installation of the pedal assemblies difficult due to the location of the bracket or casting attachment to the vehicle and the limited packaging space available.

Thus, it would be desirable to have a modular pedal assembly so that pedal arms could be pre-assembled before installation into a base component. This would improved packaging and eliminate expensive machining of various pedal assembly components, and would significantly reduce assembly time for installing the pedals in the vehicle.

SUMMARY OF THE INVENTION AND ADVANTAGES

A modular pedal assembly for attachment to a support base in a vehicle includes a first bearing block and a clutch pedal arm rotatably supported by the first bearing block for rotation about an axis. The pedal assembly also includes a second bearing block and a brake pedal arm adjacent the clutch pedal arm and rotatably supported by the second bearing block. A support interconnects the clutch and brake pedal arms for rotation about the axis. The assembly is characterized by a connector connecting the first bearing block to the second bearing block to define a pedal subassembly for attachment to a support base.

BRIEF DESCRIPTION OF THE DRAWINGS

Other advantages of the present invention will be readily appreciated as the same becomes better understood by reference to the following detailed description when considered in connection with the accompanying drawings wherein:

FIG. 3 is a magnified perspective view of the bearing block shown in FIG. 2; and FIG. 4 is a magnified perspective view of the connector shown in FIG. 2.

DETAILED DESCRIPTION OF THE PREFERRED EMBODIMENT

Figure 1:
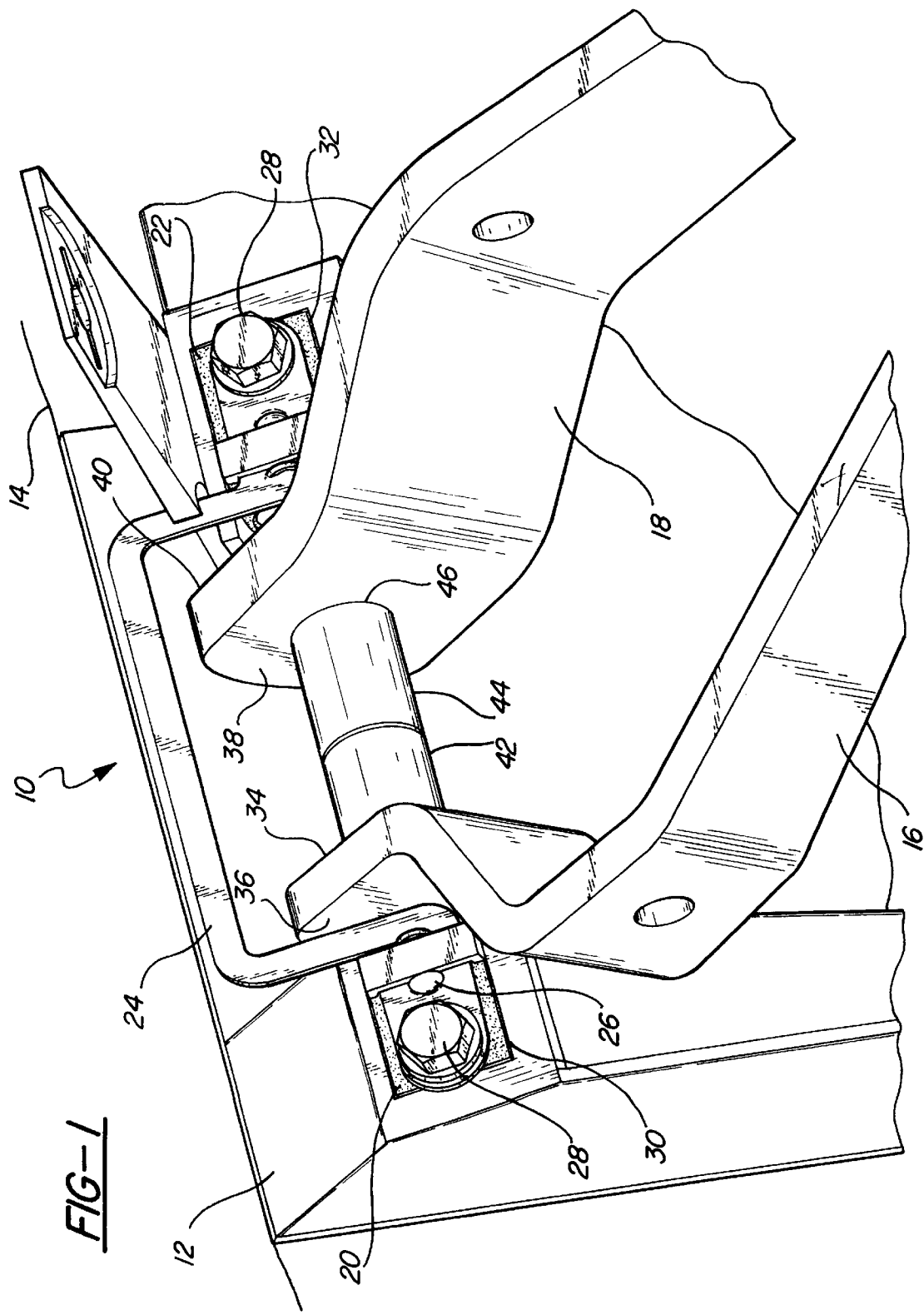
FIG. 1 is a perspective view of the modular pedal assembly.

Referring to the Figures, wherein like numerals indicate like or corresponding parts throughout the several views, a pedal assembly is shown generally at 10 in FIG. 1. The pedal assembly 10 includes a support base component 12 for attachment to a vehicle structure 14, a first pedal arm 16 extending from the base 12, and a second pedal arm 18 extending from the base 12 and spaced apart from the first pedal arm 16. The base component 12 is preferably a magnesium casting, however, castings made from other materials known in the art could also be used. Also, the base component 12 could be a bracket or other mounting component known in the art, or could possibly be integrally formed on the vehicle.

The pedal arms 16, 18 are preferably a clutch pedal arm and a brake pedal arm respectively. While only two pedal arms are shown in the pedal assembly 10, the subject invention could be used with more or less pedal arms.

The pedal assembly 10 also includes a first bearing block 20 for rotatably supporting the first pedal arm 16 with respect to the base 12 and a second bearing block 22 for rotatably supporting the second pedal arm 18 with respect to the base 12. The first 20 and second 22 bearing blocks respectively support the clutch 16 and brake 18 pedal arms for rotation about an axis. A support interconnects the arms 16, 18 for rotation about the axis. The bearing blocks 20, 22 are discussed in greater detail below.

A connector 24 is used to connect the first bearing block 20 to the second bearing block 22 to define a pedal subassembly for attachment to the base 12. The connector 24 is used to hold the bearing blocks 20, 22 and the pedal arms 16, 18 in proper alignment so that the pedal subassembly is easily and quickly installed into the base component 12. The connector 24 is preferably a strap having a plurality of tabs 26 that engage the first 20 and second 22 bearing blocks to locate and maintain the first bearing block 20 at a predetermined distance from the second bearing block 22. This ensures proper orientation and positioning of the pedal subassembly within the base component 12. The connector 24 will be discussed in greater detail below.

Once the pedal subassembly has been installed in the base component 12, the subassembly is preferably fastened to the base 12 by fasteners 28. The fasteners 28 can be bolts, screws, rivets, or other fasteners well known in the art can be used. Additionally, other fastening methods known in the art can be used to attach the subassembly to the base 12.

The first pedal arm 16 has an inner face 34 and an outer face 36 and the second pedal arm 18 has an inner face 38 and an outer face 40. When the subassembly is formed, the inner face 34 of the first pedal 16 is facing the inner face 38 of the second pedal. A first pivot tube 42 is attached to the first pedal arm 16 and a second pivot tube 44 is attached to the second pedal arm 18. The first 42 and second 44 pivot tubes are preferably inserted transversely to the pedal arms 16, 18 through an aperture 46, shown in FIG. 1, extending through the pedal arms 16, 18 such that the pivot tubes 42, 44 extend beyond the inner 34, 38 and outer 36, 40 faces.

The base 12 includes a first opening 30 for receiving the first bearing block 20 and a second opening 32 for receiving the second bearing block 22. The first 30 and second 32 openings are shown in greater detail in FIG. 2. The openings 30, 32 can be machined into the base 12 or bracket, or can be made as part of the casting for the base 12.

The base 12 includes a first extension 48 partially extending into the first opening 30 and a second extension 50 partially extending into the second opening 32. The extensions 48, 50 each have a contoured surface 52 for respectively engaging the first 20 and second 22 bearing blocks. The extensions 48, 50 are preferably rounded lugs extending into the openings 30, 32. The extensions 48, 50 include apertures 60 for receiving the fasteners 28.

The first 20 and second 22 bearing blocks, shown in greater detail in FIG. 3, including a locating portion 54 at one end for properly aligning the first 20 and second 22 bearing blocks within the first 30 and second 32 openings. The locating portions 54 are defined by a cavity 56 having a surface 58 with a contour corresponding to the contoured surface 52 of the first 48 and second 50 extensions. Once the pedal arms 16, 18 have been installed in the first 20 and second 22 bearing blocks and the connector 24 has connected the first bearing block 20 to the second bearing block 22, the subassembly is placed within the base 12 and the fasteners 28 are installed. The locating portions 54 on the bearing blocks 20, 22 are engaged with the extensions 48, 50 in the casting to ensure that the pedal arms 16, 18 are properly positioned in the base 12. Preferably, the contoured surface 52 and the surface 58 on the locating portions 42 are rounded for ease of assembly.

Figure 2:
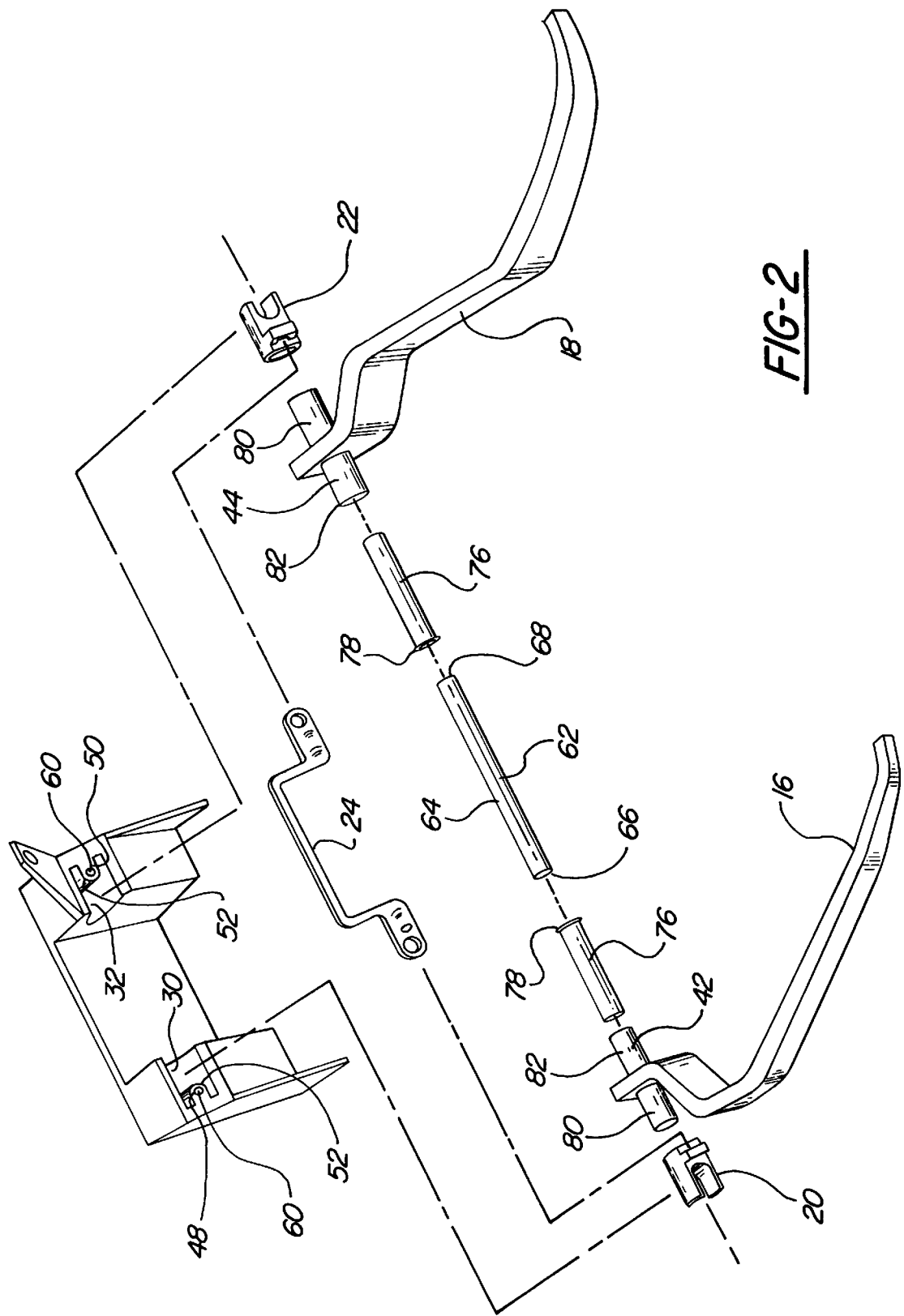
FIG. 2 is an exploded view of the modular pedal assembly.

A shaft 62, shown in FIG. 2, for supporting the first 16 and second pedal 18 arms extends from the first bearing block 20 to the second bearing block 22. The shaft 62 is preferably a solid cylindrical support shaft with a middle portion 64 that is inserted through the apertures 46 in the pedal arms 16, 18. One end 66 of the shaft 62 is inserted into the first bearing block 20 while an opposite end 68 of the shaft 62 is inserted into the second bearing block 22. The pedal arms 16, 18 rotate with respect to the shaft 62.

The first 20 and second 22 bearing blocks each include a body 70 with a longitudinal aperture 72 partially extending through the body 70. The shaft 62 is inserted through this aperture 72 into the bearing blocks 20, 22. The shaft 62 preferably does not rotate with respect to the bearing blocks 20, 22.

The body 70 includes a pair of angled sides 74, shown in FIG. 3, for properly orientating the first 20 and second 22 bearing blocks within the base 12. The angled sides 74 on the body 70 correspond to angled sides within the openings 30, 32 so that the bearing blocks 20, 22 cannot be installed upside down within the base 12.

As previously discussed, the first pivot tube 42 is attached to the first pedal arm 16 and the second pivot tube 44 is attached to the second pedal arm 18. The pivot tubes 42, 44 rotatably support the first 16 and second 18 pedal arms on the shaft 62. The first 42 and second 44 pivot tubes partially extend into the longitudinal apertures 72 of the first 20 and second 22 bearing blocks for providing a bearing surface between the first 42 and second 44 pivot tubes and the first 20 and second 22 bearing blocks, respectively.

At least one bushing 76 is installed on the shaft 62 between the first 16 and second 18 pedal arms for providing a bearing surface for the first 42 and second 44 pivot tubes. Preferably two (2) bushings 76 are installed on the shaft 62, one for each pivot tube 42, 44. The bushings 76 include a flange 78 extending circumferentially about one end 80 of the bushings. The bushings 76 are installed on the shaft 62 such that the flanges 78 on each bushing 76 face each other. The pivot tubes 42, 44 are attached to the pedal arms 16, 18 by welding or other joining methods well known in the art. The pivot tubes 42, 44 are then slid over the bushings 76. The flanges 78 are of a larger diameter than the diameter of the pivot tubes such that they extend radially outwardly from the shaft 62 beyond the pivot tubes 42, 44. The flanges 78 assist in separating the first pivot tube 42 from the second pivot tube 44 to allow the pedal arms 16, 18 to pivot independently from one another.

Each of the pivot tubes has an outside end 80 and an inside end 82. The terms outside and inside are used only for descriptive purposes and should not be considered limiting. The outside ends 80 of each of the pivot tubes 42, 44 are inserted into the corresponding bearing block 20, 22. Specifically, outside end 80 of the first pivot tube 42 is inserted through the aperture 72 in the body 70 of the first bearing block 20 and outside end 80 of the second pivot tube 44 is inserted through the aperture 72 in the body 70 of the second bearing block 22. Thus, there is a bearing surface between the bearing blocks 20, 22 and the ends 80 of the pivot tubes 42, 44. There is also a bearing surface at the inside end 82 of the pivot tubes 42, 44 between the pivot tubes 42, 44 and the bushings 76.

Finally, the connector 24 is attached to the first 20 and second 22 bearing blocks to form the pedal subassembly. Once the connector 24 is attached, the bearing blocks 20, 22 are locked together at a pre-determined distance from each other. This allows easy installation of the pedal subassembly into the base 12.

As shown in FIG. 3, the first 20 and second 22 bearing blocks each include a retainer 84 for receiving the connector 24. The retainer 84 is preferably a bridge-like member having two ends 86 supported on the body 70. The two ends 70 are interconnected by a middle span 88 that is spaced part from the body 70 to form a channel 90. The connector 24 has a first end 92 and a second end 94. The first 92 and second 94 ends of the connector 24 are received in the channels 90 of the bearing blocks 20, 22. This connection is discussed in greater detail below.

The connector 24 or strap, shown in FIG. 4, is preferably made from a resilient material, such as spring steel for example, to act as a spring for eliminating side to side play between the first 20 and second 22 bearing blocks after installation. The first 92 and second 94 ends of the connector 24 are elongated to form stiffening portions 96. The stiffening portions 96 include holes 98 through which the fasteners 28 are inserted to attach the pedal subassembly to the base 12. These stiffening portions 96 provide additional structural support once the subassembly is installed in the base 12. The ends 92, 94 of the connector 24 are interconnected by a generally U-shaped portion 100 that extends away from ends of the pedal arms 16, 18 to provide clearance for pivoting.

The connector includes at least two tabs 26 on the first end 92 and at least two tabs 26 on the second end 94. The tabs 26 coact with the retainer 84 for attaching the connector 24 to the first 20 and second 22 bearing blocks. One of the tabs 26 is located on one side of the retainer 84 while the other of the tabs 26 is located on an opposite side of the retainer 84. This arrangement is on both the first 20 and second 22 bearing blocks. This securely attaches the connector 24 to the bearing blocks 20, 22 and locks the bearing blocks 20, 22 together to form the pedal subassembly.

The preferred method for installing control pedals 16, 18 in the base component 12 comprise the steps of: rotatably supporting a first pedal arm 16 on a first bearing block 20, rotatably supporting a second pedal arm 18 on a second bearing block 22, connecting the first bearing block 20 to the second bearing block 22 to form a pedal subassembly, and installing the pedal subassembly in the base component 12.

Additional steps include locating and maintaining the first bearing block 20 at a pre-determined distance from the second bearing block 22 before installing the pedal subassembly into the base component 12. The first 20 and second 22 bearing blocks can then be fastened to the base component 12.

Also, preferably the connector 24 is made from a resilient material such as spring steel. The resilient member is attached to the first 20 and second 22 bearing blocks for eliminating side to side play after the subassembly is installed into the base component 12.

The method can further include the step of supporting the first 16 and second 18 pedal arms on a shaft 62 extending between the first 20 and second 22 bearing blocks.

A first pivot tube 42 can be attached transversely to the first pedal arm 16 and a second pivot tube 44 can be attached transversely to the second pedal arm 18. The first 42 and second 44 pivot tubes are then rotatably supported on the shaft 62. One end of the first pivot tube 42 is inserted partially into the first bearing block 20 for providing a first bearing surface between the first pivot tube 42 and the first bearing block 20, and one end of the second pivot tube 44 is inserted partially into the second bearing block 22 for providing a second bearing surface between the second pivot tube 44 and the second bearing block 22. A pre-determined distance is maintained between the first 42 and second 44 pivot tubes.

The method further includes the steps of forming a first opening 30 in the base component 12 to receive the first bearing block 20 and forming a second opening 32 in the base component 12 to receive the second bearing block 22. A locating portion 54 is provided on the first 20 and second 22 bearing blocks and a locator 48, 50 is provided adjacent to each of the first 30 and second 32 openings. The locating portions 54 are aligned with the locators 48, 50 to properly position the first 20 and second 22 bearing blocks within the base component 12.

Additional steps include providing the first 20 and second 22 bearing blocks with a retainer 84 spaced apart from the bearing blocks 20, 22 to form a channel 90, providing the connector 24 with a plurality of tabs 26, inserting one end 92 of the connector 24 through the channel 90 formed on the first bearing block 20 such that at least one of the tabs 26 is on either side of the retainer 84, and inserting an opposite end 94 of the connector 24 through the channel 90 formed on the second bearing block 22 such that at least one of the tabs 26 is on either side of the retainer 84.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A modular pedal assembly (10) for attachment to a support base (12) in a vehicle comprising:
   a first bearing block (20);
   a clutch pedal arm (16) rotatably supported by said first bearing block (20) for rotation about an axis;
   a second bearing block (22);
   a brake pedal arm (18) adjacent said clutch pedal arm (16) and rotatably supported by said second bearing block (22);
   a support for interconnecting said clutch (16) and brake (18) pedal arms for rotation about said axis;
   said assembly characterized by a connector (24) connecting said first bearing block (20) to said second bearing block (22) to define a pedal subassembly for attachment to a support base (12).

2. An assembly as set forth in claim 1 wherein said connector (24) is a strap having a plurality of tabs (26) that engage said first (20) and second (22) bearing blocks to locate and maintain said first bearing block (20) at a pre-determined distance from said second bearing block (22).

3. An assembly as set forth in claim 2 wherein said connector (24) is resilient to act as a spring for eliminating side to side play between said first (20) and second (22) bearing blocks after installation.

4. An assembly as set forth in claim 2 wherein said connector (24) has an elongated first end portion (92) connected to said first bearing block (20) and an elongated second end portion (94) connected to said second bearing block (22) for providing additional structural support once said subassembly is attached to a base (12).

5. An assembly as set forth in claim 1 including a base (12) having a first opening (30) for receiving said first bearing block (20) and a second opening (32) for receiving said second bearing block (22), said first (20) and second (22) bearing blocks including a locating portion (54) for properly aligning said first (20) and second (22) bearing blocks within said first (30) and second (32) openings.

6. An assembly as set forth in claim 5 wherein said base (12) includes a first extension (48) partially extending into said first opening (30) and a second extension (50) partially extending into said second opening (32), said first (48) and second (50) extensions each having a contoured surface (52) for respectively engaging said locating portion (54) of said first (20) and second (22) bearing blocks.

7. An assembly as set forth in claim 6 wherein each of said locating portions (54) is defined by a cavity (56) having a surface (58) with a contour corresponding to said contoured surface (52) of said first (48) and second (50) extensions.

8. An assembly as set forth in claim 5 including a shaft (62) extending from said first bearing block (20) to said second bearing block (22) for supporting said clutch (16) and brake (18) pedal arms.

9. An assembly as set forth in claim 8 wherein said first (20) and second (22) bearing blocks each include a body (70) with a longitudinal aperture (72) partially extending through said body (70) for receiving said shaft (62).

10. An assembly as set forth in claim 9 wherein said body includes a pair of angled sides (74) for properly orientating said first (20) and second (22) bearing blocks within said base (12).

11. An assembly as set forth in claim 9 including a first pivot tube (42) attached to said clutch pedal arm (16) and a second pivot tube (44) attached to said brake pedal arm (18) for rotatably supporting said clutch (16) and brake (18) pedal arms on said shaft (62).

12. An assembly as set forth in claim 11 wherein said first (42) and second (44) pivot tubes partially extend into said longitudinal apertures (72) of said first (20) and second (22) bearing blocks for providing a bearing surface between said first (42) and second (44) pivot tubes and said first (20) and second (22) bearing blocks.

13. An assembly as set forth in claim 11 including at least one bushing (76) installed on said shaft (62) between said clutch (16) and brake (18) pedal arms for providing a bearing surface for said first (42) and second (44) pivot tubes.

14. An assembly as set forth in claim 5 wherein said first (20) and second (22) bearing blocks each include a retainer (84) for receiving said connector (24).

15. An assembly as set forth in claim 14 wherein said connector (24) includes a first end (92) with at least two tabs (26) and a second end (94) with at least two tabs (26), said tabs (26) on said first (92) and second (94) ends for coaching with said retainer (84) for attaching said connector (24) to said first (20) and second (22) bearing blocks.

16. An assembly as set forth in claim 15 wherein one of said tabs (26) on said first (92) and second (94) ends of said connector (24) is located on one side of said retainer (84) while the other of said tabs (26) is located on an opposite side of said retainer (84).

17. An assembly as set forth in claim 16 wherein said retainer (84) is a bridge having two ends (86) supported on a body (70), said two ends (86) being interconnected by a middle span (88) that is spaced part from said body (70) to form a channel (90).

18. An assembly as set forth in claim 17 wherein said first (92) and second (94) ends of said connector (24) are received in said channels (90).

19. A method for installing a pedal assembly (10) in a support base (12) for a vehicle comprising the steps of:
   rotatably supporting a clutch pedal arm (16) on a first bearing block (20);
   rotatably supporting a brake pedal arm (18) on a second bearing block (22);
   connecting the first bearing block (20) to the second bearing block (22) to define a pedal subassembly; and
   attaching the pedal subassembly to a support base (12).

20. A method as set forth in claim 19 further including the steps of locating and maintaining the first bearing block (20) at a pre-determined distance from the second bearing block (22) before installing the pedal subassembly into the support base (12).

21. A method as set forth in claim 20 further including the step of supporting the clutch (16) and brake (18) pedal arms on a shaft (62) extending between the first (20) and second (22) bearing blocks.

22. A method as set forth in claim 21 further including the steps of attaching a first pivot tube (42) transversely to the clutch pedal arm (16) and a second pivot tube (44) transversely to the brake pedal arm (18).

23. A method as set forth in claim 22 further including the steps of rotatably supporting the first (42) and second (44) pivot tubes on the shaft (62), inserting one end of the first pivot tube (42) partially into the first bearing block (20) for providing a first bearing surface between the first pivot tube (42) and the first bearing block (20), and inserting one end of the second pivot tube (44) partially into the second bearing block (22) for providing a second bearing surface between the second pivot tube (44) and the second bearing block (22).

24. A method as set forth in claim 23 further including the step of maintaining a pre-determined distance between the first (42) and second (44) pivot tubes.

25. A method as set forth in claim 19 further including the step of fastening the first (20) and second (22) bearing blocks to the support base (12).

26. A method as set forth in claim 19 further including the steps of forming a first opening (30) in the support base (12) to receive the first bearing block (20) and forming a second opening (32) in the support base (12) to receive the second bearing block (22).

27. A method as set forth in claim 26 further including the steps of providing a locating portion (54) on the first (20) and second (22) bearing blocks, providing a locator (48, 50) adjacent to each of the first (30) and second (32) openings, and aligning the locating portions (54) with the locators (48, 50) to properly position the first (20) and second (22) bearing blocks within the support base (12).

28. A method as set forth in claim 19 further including the step of attaching a resilient member (24) to the first (20) and second (22) bearing blocks for eliminating side to side play.

29. A method as set forth in claim 19 further including the steps of providing the first (20) and second (22) bearing blocks with a retainer (84) spaced apart from the bearing blocks (20, 22) to form a channel (90), providing a connector (24) with a plurality of tabs (26), inserting one end (92) of the connector (24) through the channel (90) formed on the first bearing block (20) such that at least one of the tabs (26) is on either side of the retainer (84), and inserting an opposite end (94) of the connector (24) through the channel (90) formed on the second bearing block (22) such that at least one of the tabs (26) is on either side of the retainer (84).

30. A modular pedal assembly (10) for attachment to a support base (12) in a vehicle comprising:
   a first bearing block (20);
   a first pedal arm (16) rotatably supported by said first bearing block (20);
   a second bearing block (22);
   a second pedal arm (18) adjacent said first pedal arm (16) and rotatably supported by said second bearing block (22);
   a support shaft (62) to support said first (16) and second (18) pedal arms for rotation about a common axis;
   said assembly characterized by a connecting strap (24) connecting said first bearing block (20) to said second bearing block (22) to define a pedal subassembly prior to attachment to a support base (12).

31. An assembly as set forth in claim 30 wherein said connecting strap (24) is fastened to at least one of said hearing blocks (20, 22) with at least one fastener (28).

32. An assembly as set forth in claim 31 wherein said connecting strap (24) is flexible.

33. A method for installing a pedal assembly (10) in a support base (12) for a vehicle comprising the steps of:

(a) rotatably supporting a first pedal aim (16) on a first bearing block (20);

(b) rotatably supporting a second pedal arm (18) on a second bearing block (22);

(c) connecting the first bearing block (20) to the second bearing block (22) with a flexible connector (24) to define a pedal subassembly; and (d) attaching the pedal subassembly to a support base (12).

34. A method as set forth in claim 33 further including the step of supporting the first (16) and second (18) pedal arms on a shaft (62) extending between the first (20) and second (22) bearing blocks prior to step (c).

35. A method as set forth in claim 34 further including the step of fastening the first (20) and second (22) bearing blocks to the support base (12) after step (d).

* * * * *